(12) United States Patent
Flegel

(10) Patent No.: US 7,772,723 B1
(45) Date of Patent: Aug. 10, 2010

(54) ELECTRICAL PANEL HAVING ELECTRICALLY ISOLATED NEUTRAL STAB

(75) Inventor: David D. Flegel, Racine, WI (US)

(73) Assignee: Reliance Controls Corporation, Racine, WI (US)

( * ) Notice: Subject to any disclaimer, the term of this patent is extended or adjusted under 35 U.S.C. 154(b) by 82 days.

(21) Appl. No.: 12/028,505

(22) Filed: Feb. 8, 2008

(51) Int. Cl.
*H01H 47/00* (2006.01)
(52) U.S. Cl. ...................................................... 307/125
(58) Field of Classification Search .................. 307/125
See application file for complete search history.

(56) References Cited

U.S. PATENT DOCUMENTS

| 7,449,645 B1 * | 11/2008 | Flegel ..................... 200/51.11 |
| 2009/0058191 A1 * | 3/2009 | Nordman et al. ............ 307/112 |

\* cited by examiner

*Primary Examiner*—Robert L. Deberadinis
(74) *Attorney, Agent, or Firm*—Boyle Fredrickson, S.C.

(57) ABSTRACT

An electrical panel is operable to receive electrical power from a first power supply and a second power supply. The electrical panel includes a neutral bus conductor having a stab configured to engage one or more switching devices and a separation formed in a bus conductor to electrically isolate one of the stabs.

14 Claims, 7 Drawing Sheets

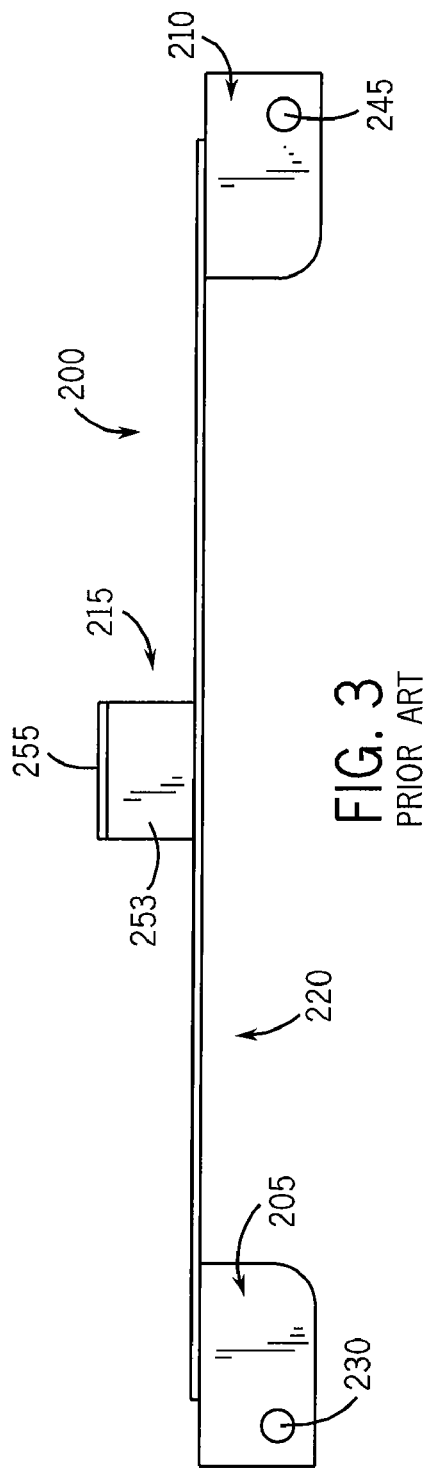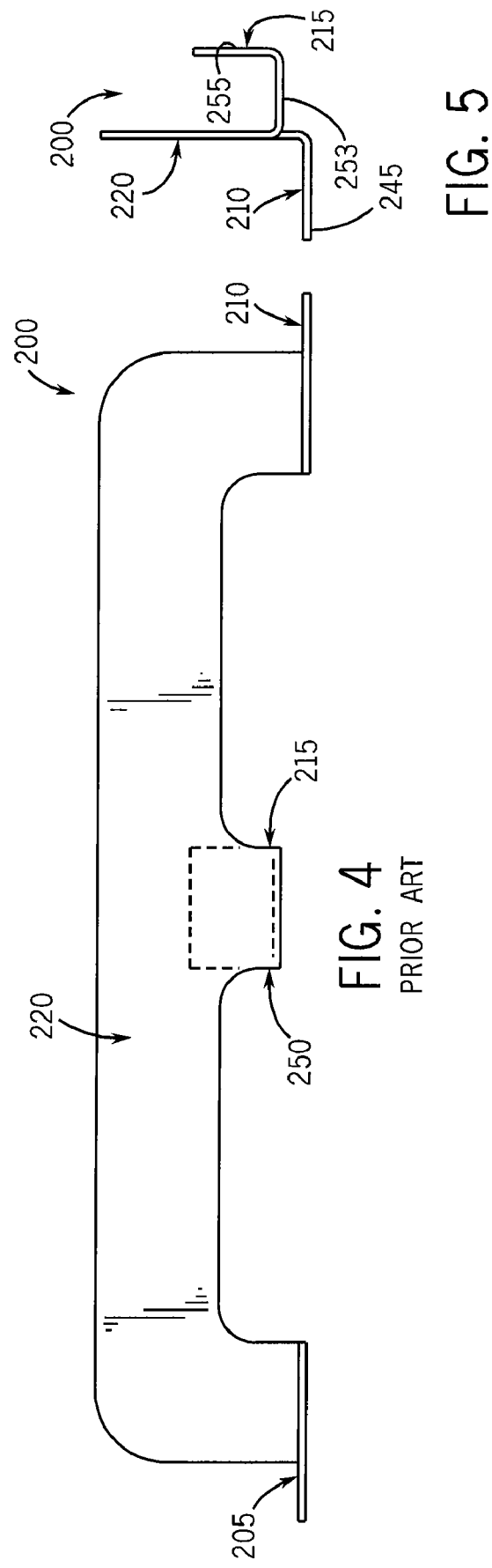

ELECTRICAL PANEL HAVING ELECTRICALLY ISOLATED NEUTRAL STAB

FIELD OF THE INVENTION

This invention relates to a neutral bracket apparatus for an electrical panel, and more specifically, to a neutral bracket apparatus configured to provide electrical connection between a pair of opposed neutral transfer switch assemblies and a pair of opposed neutral side bars mounted on the electrical panel.

BACKGROUND OF THE INVENTION

In today's electrical supply systems, there are occasions when alternate sources of electrical power are necessary or desirable. For example, the capability of switching from utility power to emergency generator power is extremely important for many businesses, hospitals and industries, as well as residential dwellings.

In certain applications, it is desirable for separate electrical circuits, or separate groups of electrical circuits, to be arranged so that when one circuit or group of circuits is switched to a conductive state, another circuit or group of circuits is switched to a non-conductive state in an alternating fashion. In one arrangement, it may be desirable to alternately switch a common load between separate power sources, so that as one power source is disconnected from the load, the second power source is connected after a negligible delay so as to limit interruption of electrical power to the common load. In order that the desired period of alternate switching may be minimized, a need has been recognized to employ a coupling mechanism which functions to switch one circuit or group of circuits OFF as the other circuit or group of circuits is switched ON.

A known electrical load center includes an electrical panel with a pair of transfer-type switches that selectively control the supply of electrical power from a standard utility 125/250 VAC service and a generator power supply, respectively. The typical generator includes a pair of "hot" or electrically-charged conductors, and a "neutral" or return conductor.

There are instances in which it is convenient to use a 125/250 VAC "bonded-neutral" generator (which includes a neutral conductor and a safety grounding conductor that are internally bonded together) for the purpose of powering structures or dwellings. A building is typically fed by a standard utility 125/250 VAC service that includes a neutral bus connected to a safety grounding bus, and the safety grounding bus conductor is connected to a grounding rod or net. Using the two-pole switch configuration described above, the pair of "hot" conductors from the generator are connected to the appropriate poles of the two-pole transfer switch, the neutral conductor of the generator is non-switchably connected to the neutral bus conductor of the electrical panel, and the safety grounding conductor of the generator is non-switchably connected to the safety grounding bus conductor of the electrical panel.

However, this configuration, known as a "non-separately derived system", has drawbacks when used with bonded-neutral generators. For example, assume the transfer switch of the above-described system configuration is in the ON position such that the generator is supplying electrical power via the pair of "hot" conductors to a common load in the dwelling. Electrical current flows from one of the "hot" conductors of the generator through the transfer-type switch in a known manner so as to power the electrical load in the dwelling. The electrical current then returns via the neutral conductor of the load to the neutral bus conductor of the load center. A first portion of electrical current then flows from the neutral bus conductor of the building back to the neutral conductor of the generator, thus completing the circuit path. A remaining portion of electrical current flows from the neutral bus conductor of the building to a neutral-to-ground tie bar at the electrical panel, through the grounding bus conductor, back through the safety ground-to-neutral bonding conductor of the generator, and then through the neutral conductor of the generator, completing another circuit path. It is this undesired dual path for electrical current to follow back from the load to the generator that creates a problem.

Rather than the dual path current flow described above, such a power system should be electrically grounded in such a manner that prevents a flow of electrical current via the neutral conductor of the building back to the safety grounding conductor of the generator, in all situations except for an electrical power fault (q.v., Article 250 of the National Electrical Code). The safety grounding conductor is expected to be pristine or absent of the normal flow of electrical current, and instead is to be used to conduct electrical current safely to ground only when there is an electrical fault occurrence. Thus, system configurations of this type (known as "non-separately derived" systems") are undesirable because such configurations allow a normal flow of electrical current to pass via the neutral conductor of the building to the safety grounding conductor of the generator. Another drawback of above-described known system configurations is that the flow of electrical current to the safety grounding conductor of the generator has been known to trigger a ground fault circuit interrupter at the generator. When triggered, the ground fault circuit interrupter will de-energize the "hot" conductors of the generator and prevent the supply of electrical power to the service bus conductor of the building.

In an attempt to address the drawbacks described above, a "separately-derived" system configuration can be utilized. This system configuration uses one or more transfer switches to control switching connection of the neutral conductor and the pair of "hot" conductors of a "bonded neutral" generator. Again, for purposes of example, assume the transfer switches are initially positioned such that electrical current flows from one of the pair of "hot" electrical conductors of the generator to the common load of the building. Specifically, the electrical current flows from the "hot" conductor of the generator through the transfer-type switch in a known manner, and to the electrical load. The electrical current then returns via the neutral conductor of the electrical load. However, instead of electrical current flowing directly to the neutral bus conductor of the dwelling, the flow of electrical current is first routed by a separate neutral switch assembly to the neutral conductor of the generator, thus completing the circuit. Thereby, this system prevents the undesired flow of electrical current through the generator safety ground-to-neutral bonding conductor and back to the generator neutral conductor, as noted previously.

In certain configurations, one or more standard linked circuit breakers or switches are used to selectively transfer power supplied to an electrical panel between a primary (typically utility) power supply and an auxiliary (typically generator) power supply. In configurations such as this, there is a need to develop a satisfactory system for connecting the neutral switch contacts of the circuit breaker or switch to the neutral bus bars or lugs of the panel to which the circuit breaker or switch is connected.

SUMMARY OF THE INVENTION

It is an object of the present invention to provide a neutral bracket apparatus that can be readily adapted to an electrical panel. It is another object of the present invention to provide a neutral bracket apparatus configured to connect a pair of opposed single-pole transfer switch assemblies in electrical connection with neutral conductors associated with a generator and a utility service, respectively, to provide alternative sources of electrical power to the electrical panel.

In accordance with one aspect, the present invention provides a neutral connection arrangement for use with a pair of aligned transfer switch assemblies of an electrical panel. The first transfer switch assembly is operable to regulate electrical connection of a neutral conductor of a utility service, and the second transfer switch assembly is operable to connect a neutral conductor of a generator. In one embodiment, the neutral connection arrangement is in the form of a neutral bracket apparatus that includes a bracket member having a first mount member, a second mount member, and a third mount member. The first mount member is attached at the first neutral bus of the electrical panel, and the second mount member is attached at the second neutral bus of the electrical panel located opposite the first neutral bus. The neutral bracket apparatus includes an elongated body portion that electrically connects the first and second mount members. The third mount member is generally U-shaped and extends from the elongated body portion for electrical connection to the first and second transfer switch assemblies. The neutral bracket apparatus includes a first fastener configured to be received through a first opening at the first mount member to couple the apparatus to the first neutral bus bar, and a second fastener configured to be received through a second opening at the second mount member to couple the apparatus to the second neutral bus bar. The elongated body portion may be generally flat and linear along its length, and generally perpendicular in alignment relative to the first and second mounting members. The third mount member is generally centrally located along a length of the elongated body portion. One leg of the U-shaped third mount member is in generally parallel alignment to and attached at one edge of the elongated body portion, and the other leg of the U-shaped third mount member is attached to both the first and second transfer switches.

In another version, the neutral bracket apparatus may have an outer end secured to one of the neutral buses of the panel, and an inner end that is supported at the center of the panel by an insulating block. The inner end of the neutral bracket has an inner connection member that is engaged by the transfer switch assemblies.

The neutral connection arrangement may also be in the form of a neutral terminal secured to an insulating block that is mounted to the wall of the panel. A neutral conductor is secured to the neutral terminal. An inner connection member is engaged with the neutral terminal, which in turn is engaged by the transfer switch assemblies.

The present invention also provides an electrical panel operable to receive electrical power from a first power supply and a second power supply. The electrical panel comprises a first neutral bus bar spaced from a second neutral bus bar, a first transfer switch operable to selectively interrupt electrical connection to a first neutral conductor of the first power supply, and a second transfer switch operable to selectively interrupt electrical connection to a second neutral conductor of the second power supply. The electrical panel also includes a neutral connection arrangement with which the first and second transfer switches are engaged, substantially in accordance with the foregoing summary.

In accordance with another aspect of the invention, an electrical panel has a bus conductor that is notched to create a neutral stab segment that is electrically isolated from the bus conductor.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 3 is a detailed top plan view of the neutral bracket apparatus incorporated into the electrical panel as shown in FIG. 1;

FIG. 4 is a detailed front elevation view of the neutral bracket apparatus of FIG. 3;

FIG. 5 is a detailed end elevation view of the neutral bracket apparatus of FIG. 3;

DETAILED DESCRIPTION OF THE INVENTION

Figure 1:
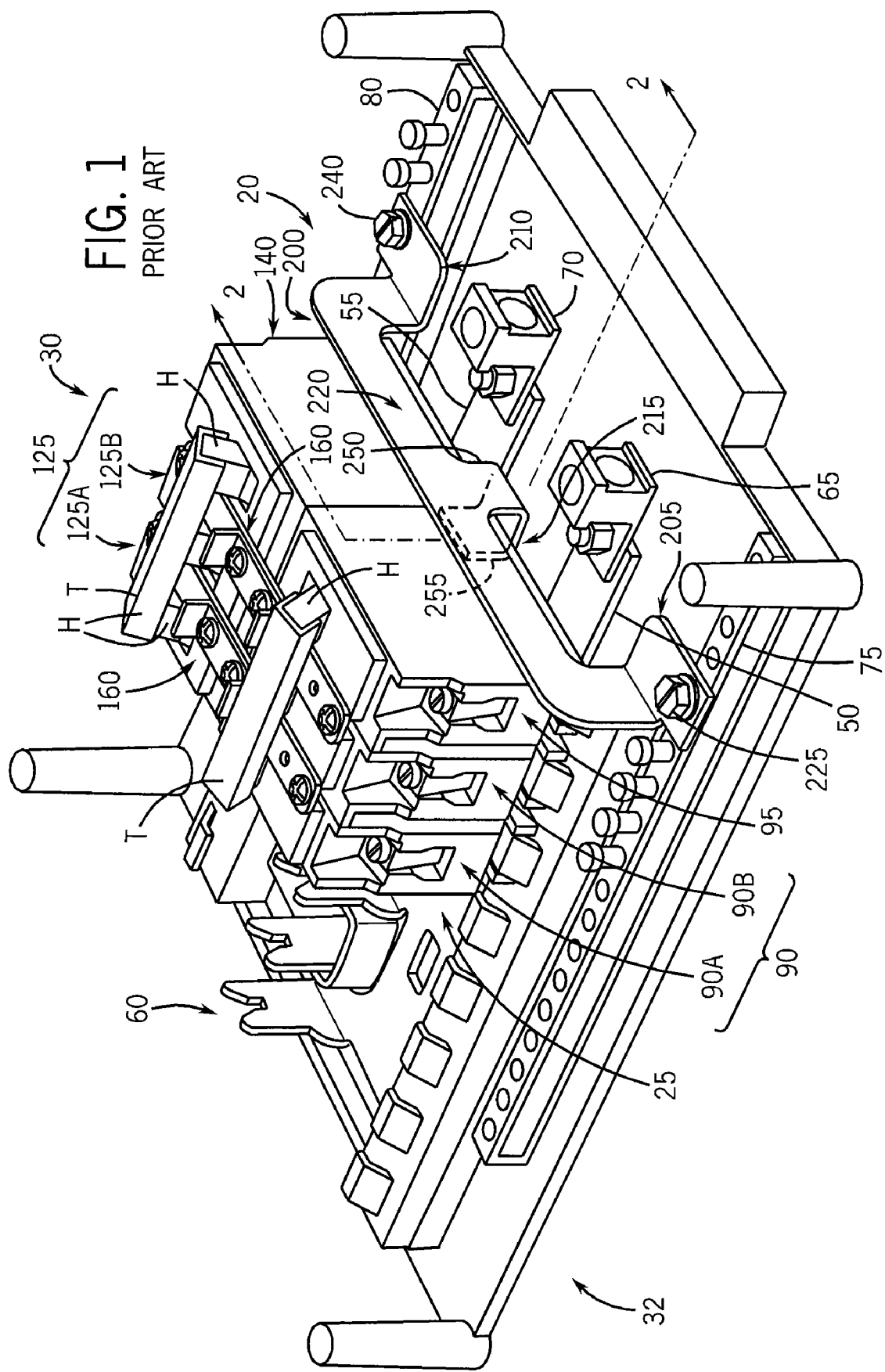
FIG. 1 is an isometric view of a neutral bracket apparatus mounted on an electrical control panel in a known manner.
Figure 1A:
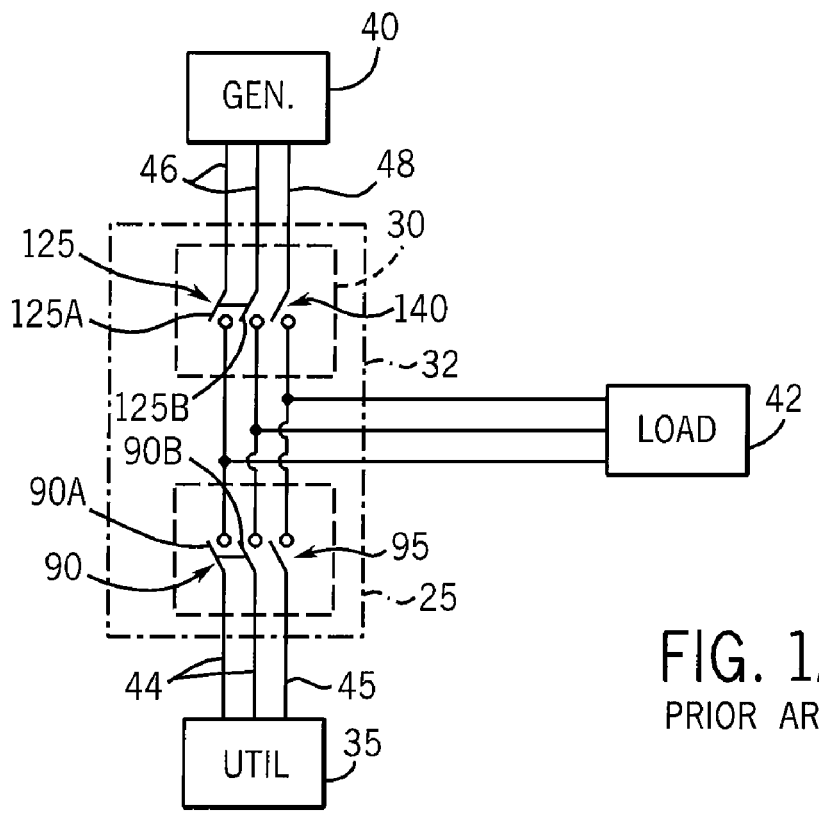
FIG. 1A is a general circuit diagram of the electrical panel shown in FIG. 1 electrically connected to receive electrical power from one of two power sources, e.g. from either utility service or a generator.

FIG. 1 illustrates a preferred embodiment of neutral bracket apparatus 20 in accordance with the present invention. Neutral bracket apparatus 20 is mounted to a conventional load center or electrical panel 32, in combination with a pair of opposed switch assemblies 25 and 30. FIG. 1A is a general schematic diagram that illustrates the electrical circuitry of the electrical panel 32, which is generally configured to switch the supply electrical power between a utility service 35 and a generator 40 to an electrical load 42. The utility service 35 generally includes a pair of "hot" line conductors 44 and a neutral conductor 45 in electrical connection with the first switch assembly at the electrical panel 32. In a similar manner, the generator 40 includes a pair of "hot" line conductors 46 and a neutral conductor 48 in electrical connection with the second switch assembly 30 at the electrical panel 32.

Referring to FIG. 1, the electrical panel 32 includes a single-phase panel board as manufactured by Siemens™, catalog number G1624L1125CU. The electrical panel 32 generally includes a first service bus conductor 50 and a second service bus conductor 55. Each service bus conductor is electrically connected to a series of stabs 60. Each stab 60 is configured to receive a circuit breaker or transfer switch assembly in a known manner to control making and breaking electrical connection to the first and second service bus conductors 50 and 55. The first service bus conductor 50 is connected to a first lug connector 65, and the second service bus conductor 55 is connected to a second lug connector 70. The lug connectors 65 and 70 are adapted to be electrically connected in a known manner to supply electrical power to another control panel or load (not shown). The load center panel 32 further includes a left neutral side bar 75 and a spaced apart, generally parallel right neutral side bar 80. Left and right neutral side bars 75 and 80, respectively, constitute an electrically conductive common junction for the connection of return neutral wires or conductors from distribution branch circuits (not shown) connected in a conventional manner to the electrical panel 32.

Referring now to FIGS. 1 and 1A, the first triple switch assembly 25 is generally tandemly aligned with the second triple switch assembly 30. The first triple switch assembly 25 is configured to control the feed of electrical power from the utility service 35 to the electrical panel 32. The first triple switch assembly 25 generally includes a pair of single-pole transfer switches 90A and 90B operable to selectively make or interrupt the supply of electrical power via "hot" conductors 44 to the first and second service bus conductors 50 and 55 (See FIG. 1) of the electrical panel 32, and a single-pole transfer switch 95 which is operable to selectively make or interrupt electrical connection of the neutral conductor 45 of the utility service 35 to the neutral side bars 75 and 80 (see FIG. 1) of the electrical panel 32. The triple switch assembly 25 is mounted in a snapped-on fashion to stabs 60 and neutral leg 255 (described hereafter) in a conventional manner for electrical connection to the first and second service bus conductors 50 and 55, and neutral bracket member 200 (See FIG. 1). The two single pole transfer switches 90A and 90B generally include electrical contacts (not shown) configured in a conventional manner to be electrically connected to the pair of "hot" conductors 44 from the utility service 35 (See FIG. 1A). The single-pole switch 95 includes an electrical contact configured in a conventional manner to be electrically connected to the neutral conductor 45 of the utility service 35 (see FIG. 1A). As illustrated in FIG. 1, the two single-pole transfer switches 90A and 90B are positioned adjacent the single-pole transfer switch 95 at the electrical panel 32.

Still referring to FIGS. 1 and 1A, the second triple switch assembly 30 is configured to control the supply of electrical power from the generator 40 to the electrical panel 32. The second triple switch assembly 30 includes a pair of single-pole switches 125A and 125B shown in FIG. 1A) operable to selectively make or interrupt electrical connection for the supply of electrical power via "hot" conductors 46 of the generator 40 (See FIG. 1A) to the first and second service bus conductors 50 and 55 of the electrical panel 32 (See FIG. 1). The second triple switch assembly 30 also includes a single-pole transfer switch 140 operable to selectively make or interrupt electrical connection of the neutral conductor 48 of the generator 40 (See FIG. 1A) to the neutral side bars 75 and 80 of the electrical panel 32 (See FIG. 1). Although FIG. 1A illustrates utility service 35 as being located on the left side of the panel 32 and the generator 40 as being located on the right side of the panel 32, it should be understood to those skilled in the art that the utility service 35 and the generator 40 can be switched to opposite sides of the electrical panel 32.

In a like manner to the three-pole transfer switch 25 described above, the three-pole switch 30 includes two single-pole transfer switches 125A and 125B with conventional electrical contacts (not shown) configured to be electrically connected in a conventional manner to the pair of "hot" conductors 46 of the generator 40 (See FIG. 1A), and a single-pole transfer switch 140 with a conventional electrical contact (not shown) configured to be electrically connected in a conventional manner to the neutral line conductor 48 of the generator 40 (See FIG. 1A). Also, in a similar manner to the three-pole transfer switch 25, the three-pole transfer switch 30 is mounted or plugged in a conventional manner to the stabs 60 of the electrical panel 32, and neutral leg 255 (explained hereafter) for electrical connection to the service bus conductors 50 and 55, and neutral bracket member 200. The two single-pole transfer switches 125A and 125B are positioned adjacent the single-pole transfer switch 140.

Figure 2:
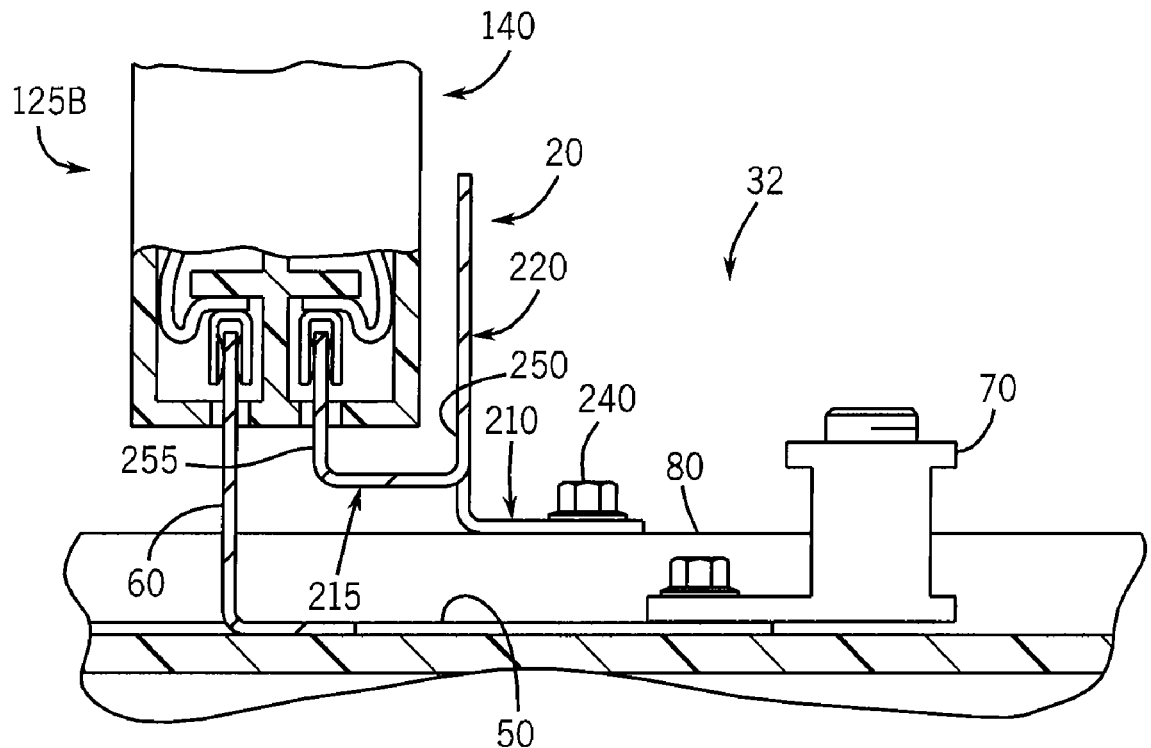
FIG. 2 is a partial cross-section view along line 2-2 of FIG. 1.

The preferred transfer switches 25 and 30 depicted in FIGS. 1 and 2 are standard, commercially available electrical switch mechanisms of the type manufactured by the ITE Circuit Protection Division of Siemens Energy and Automations Inc™ as their Type QP, three-pole circuit breakers. Upon the supply of electrical power via the utility service 35 or the generator 40 (See FIG. 1A), the neutral bracket apparatus 20 is configured to return the flow of electrical current via connection of one of the single-pole transfer switches 95 and 140 to the respective neutral conductors 45 and 48 of the utility service 35 and the generator 40 (See FIG. 1A), respectively.

Each of switches 90A, 90B, 95, 125A, 125B and 140 has a switch handle shown at H, for placing the switch in either an ON condition or and OFF condition, in a manner as is known. The switch handles H of switches 90A, 90B and 95 are connected for movement together via a conventional channel-type handle tie T. A similar handle tie T is connected to handles H of switches 125A, 125B and 140, for moving the switch handles H together. A pair of slidable interlock assemblies 160 are positioned between the opposed sets of tied-together switch handles H, for ensuring that switches 25 and 30 are not in the ON position at the same time. Representatively, each interlock assembly 160 may have a construction and operation as shown and described in Flegel U.S. Pat. No. 6,927,349 issued Aug. 9, 2005, or Flegel U.S. Pat. No. 6,096, 986 issued Aug. 1, 2000, or Flegel U.S. Pat. No. 6,013,193 issued Feb. 29, 2000, the disclosures of which are hereby incorporated by reference.

As illustrated in FIG. 1, the preferred embodiment of the neutral bracket apparatus 20 of the invention includes a bracket member 200 mechanically and electrically interconnected between the neutral side bars 75 and 80 and the neutral transfer switches 95 and 140 at the electrical panel 32. The preferred bracket member 200 is fabricated as a unitary fabricated or molded member comprised of an electrically conductive material, e.g. a copper alloy or any other satisfactory conductive material. The neutral bracket member 200 is mounted in electrical connection to maintain the voltage potential at each of the neutral bars 75 and 80 at or close to zero volts.

As shown in FIGS. 1 and 2-5, the preferred bracket member 200 includes a first mount member 205, a second mount member 210, a third mount member 215, and an elongated central body portion 220 to provide an electrical connection between the first, second, and third mount members 205, 210, and 215, respectively.

Referring back to FIG. 1, the first mount member 205 is attached at the first neutral bus bar 75, and the second mount member 210 is attached at the second neutral bus bar 80. The first and second mount members 205 and 210 have a generally planar configuration, and are configured so as to be received in electrical contact with left and right neutral bus bars 75 and 80, respectively. A first fastener 225 is configured to be received through a first opening 230 at the first mount member 205 to couple the neutral bracket apparatus 20 to the first neutral bus bar 75. In a similar manner, a second fastener 240 is configured to be received through a second opening 245 at the second mount member 210 to couple the neutral bracket apparatus 20 to the second neutral bus bar 80.

As shown in FIGS. 1 and 2, the third mount member 215 is generally U-shaped and extends laterally from the elongated central body portion 220 for electrical connection to both neutral transfer switch assemblies 95 and 140. Referring to FIGS. 2-5, the third mount member 215 includes a first leg 250 that is in generally parallel alignment relative to, and electrically connected at, a central location along the elongated body portion 220. First leg 250 depends from a lower edge defined by elongated body portion 220, and a lateral leg 253 extends from the lower end defined by first leg 250. Lateral leg 253 is generally perpendicular to first leg 250. At the outer end of lateral leg 253, an opposite second leg 255 of the third mount member 215 extends upwardly and is configured to be received in electrical contact at both neutral transfer switch assemblies 95 and 140 in a conventional manner, similar to electrical connection of the two-pole transfer switches 90 and 125 to the stabs 60 described above.

Referring to FIGS. 2-5, the elongated body portion 220 generally electrically interconnects the first and second mount members 205 and 210, respectively, with the third mount member 215. In the illustrated embodiment, elongated body portion 220 is generally linear along its length and has a planar configuration, and extends generally perpendicularly relative to the first and second mounting members 205 and 210. It should be understood, however, that while the illustrated elongated body portion 220 is generally planar, the particular shape and configuration of the elongated body portion 220 can vary, e.g. body portion 220 may have a non-planar configuration, or may be in the form of a cylindrical rod, plate member, etc.

This description has used expressions such as "transfer switch", "transfer-type switch", "switch mechanism", "two-pole switch", etc. In the illustrated embodiment, the specific switch employed is a circuit breaker switch such as is available from Siemens Energy and Automation as its QP Series, although it is understood that other circuit breaker switches may be employed.

Figure 6:
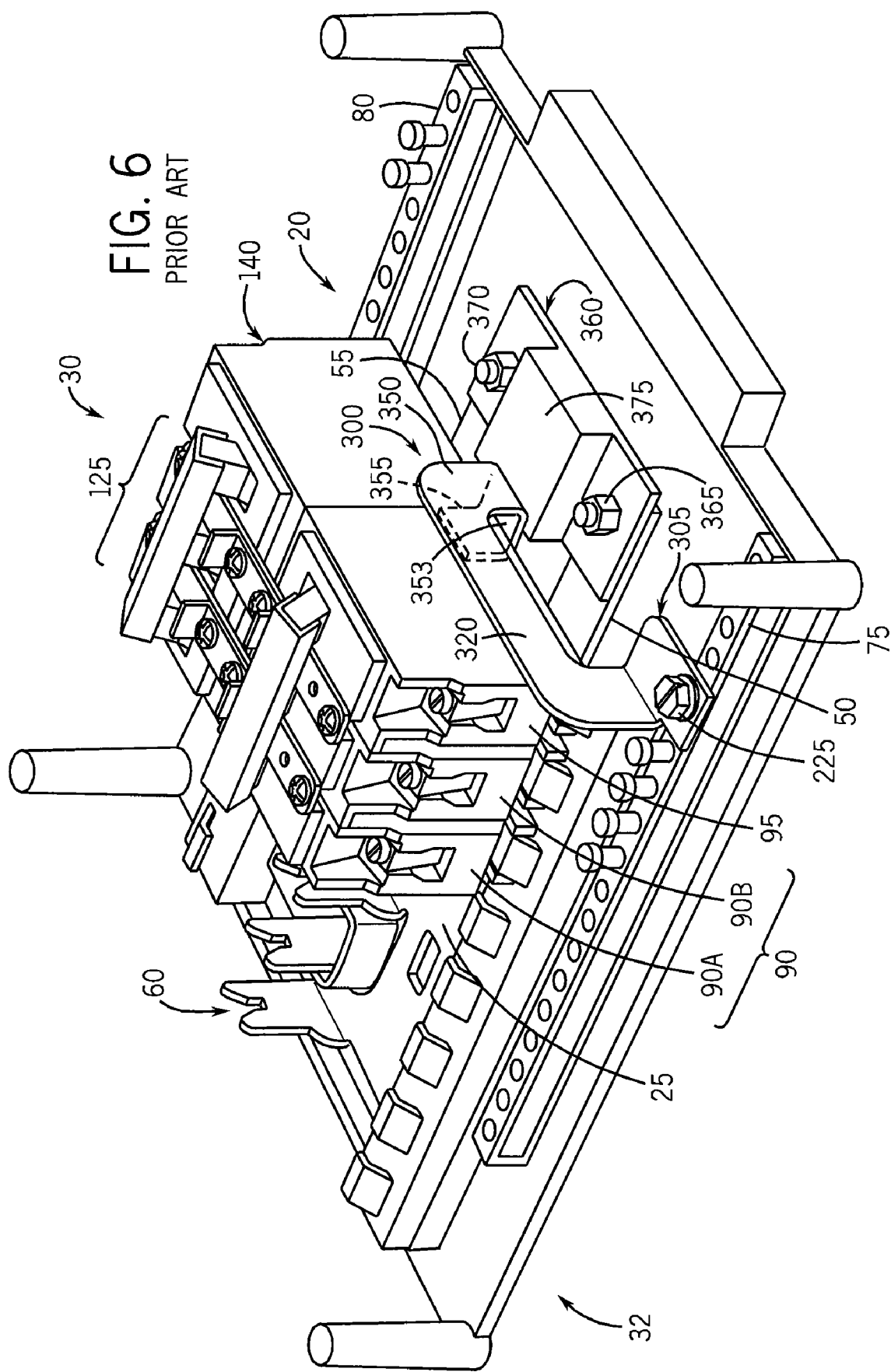
FIG. 6 is a view similar to FIG. 1, showing an isometric view of an alternate embodiment of a neutral connection apparatus mounted on an electrical control panel in a known manner.

FIG. 6 illustrates another embodiment of a neutral connection arrangement in accordance with the present invention, and like reference characters will be used where possible to facilitate clarity. In this embodiment, a neutral connection bracket 300 is connected to only one of the neutral side bars 75, 80. In the illustrated embodiment, neutral connection bracket 300 is shown as being connected to neutral bar 75 using fastener 225, although it is understood that a neutral connection bracket similar to bracket 300 may also be secured to neutral side bar 80. Neutral connection bracket 300 essentially consists of slightly over half the length of neutral bracket 200 as described previously, including a mount member 305, a body portion 320, a first leg 350, a lateral leg 353 and a second leg 355. An insulating block 360 is secured to electrical panel 32, using a pair of screw studs 365, 370 and associated nuts. Insulating block 360 includes an outwardly facing support surface 375, which supports lateral leg 353 of neutral connection bracket 300. While not shown, lateral leg 353 of neutral connection bracket 300 is preferably secured in position on insulating block 360 using a screw or other satisfactory fastener arrangement. In this embodiment, second leg 355 is configured to engage both switches 95 and 140 in electrical contact at both neutral transfer switch assemblies 95 and 140 in a conventional manner. The neutral is provided to transfer switch assemblies 95 and 140 from only one of the neutral bars, in this case neutral bar 75.

Figure 7:
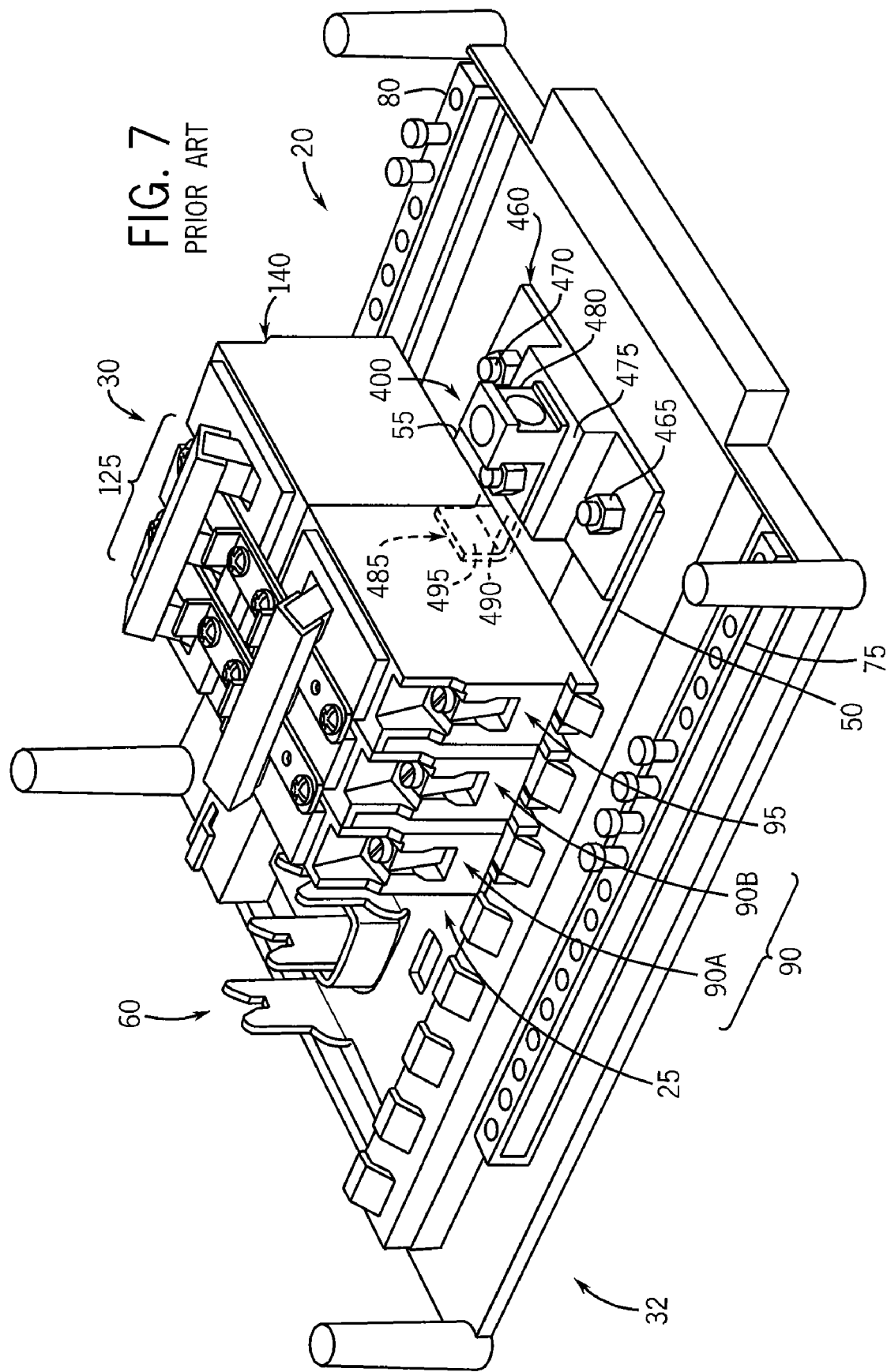
FIG. 7 is a view similar to FIGS. 1 and 6, showing yet another alternate embodiment of a neutral bracket apparatus mounted on an electrical control panel in a known manner.

FIG. 7 illustrates another embodiment of a neutral connection arrangement in accordance with the present invention, and like reference characters will again be used where possible to facilitate clarity. In this embodiment, a neutral terminal assembly 400 is used to provide a neutral connection to both transfer switch assemblies 95 and 140. Neutral terminal assembly 400 includes an insulating block 460 secured to electrical panel 32, using a pair of screw studs 465, 470 and associated nuts. Insulating block 360 includes an outwardly facing support surface 475, and a neutral connection terminal, in the form of a neutral lug connector 480, is secured to support surface 475 in any satisfactory manner, such as by means of a screw or the like. A neutral connector 485, which is generally L-shaped and includes a lateral mounting leg 490 and an inner connector leg 495, is secured to insulating block 460 along with neutral lug connector 480. Neutral connector 485 is in contact with neutral lug connector 480, so that engagement of both switches 95 and 140 with inner connector leg 495 provides a neutral connection to transfer switch assemblies 95 and 140 without connection to the neutral bars 75, 80. This embodiment is particularly of interest for use in an electrical panel that does not include neutral bars. If one or more neutral bars are provided, such as neutral bars 75, 80, the neutral lug connector may be connected to the neutral bar by means of a wire lead, conductive strap, etc. (not shown).

In the embodiments shown in FIGS. 6 and 7, the lugs or other connections to first service bus conductor and second service bus conductor 55 are at a location other than that illustrated in FIG. 1, e.g. outwardly of insulating blocks 360, 460.

Figure 8:
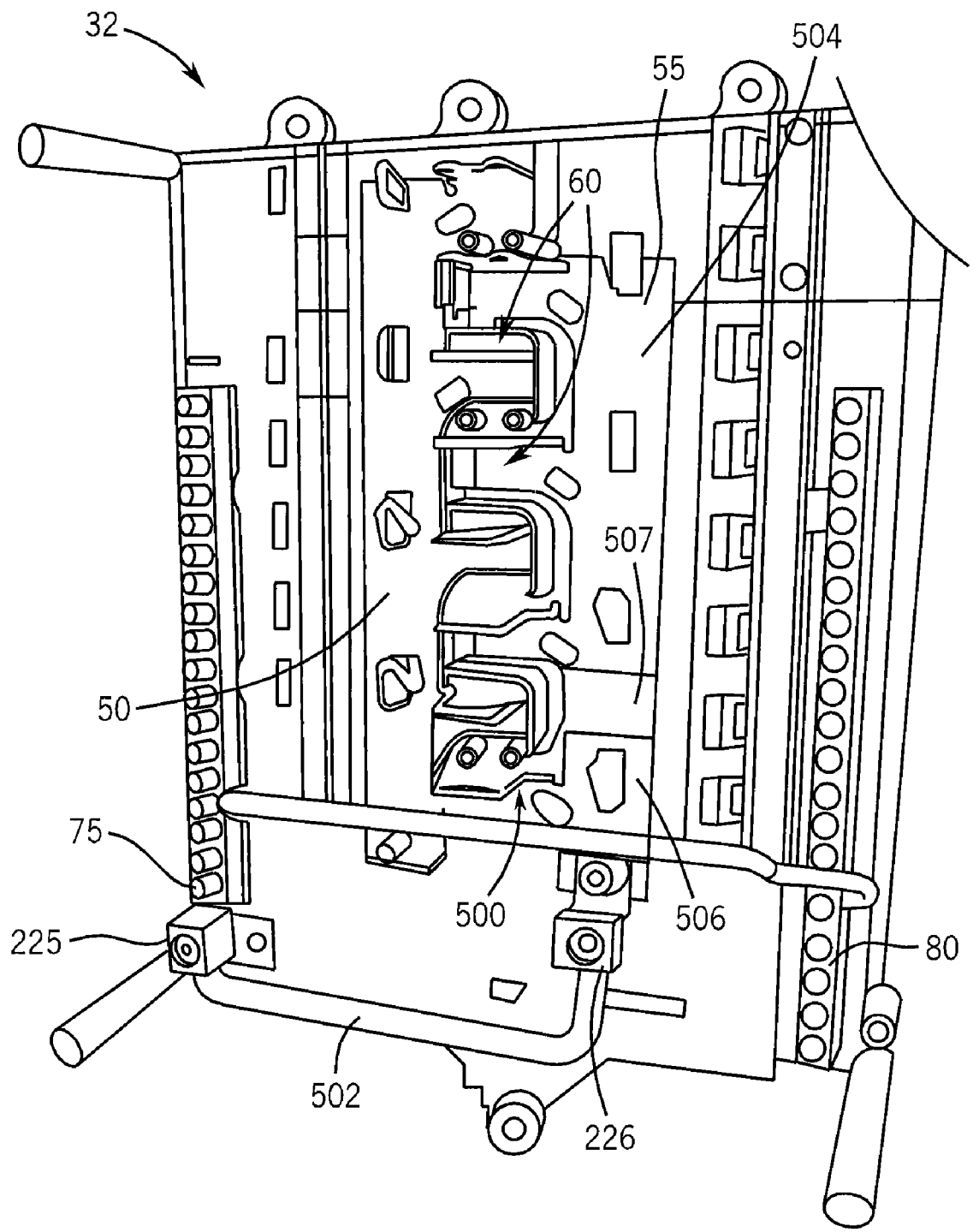
FIG. 8 is a detailed top view of an electrical panel according to the present invention.
Figure 9:
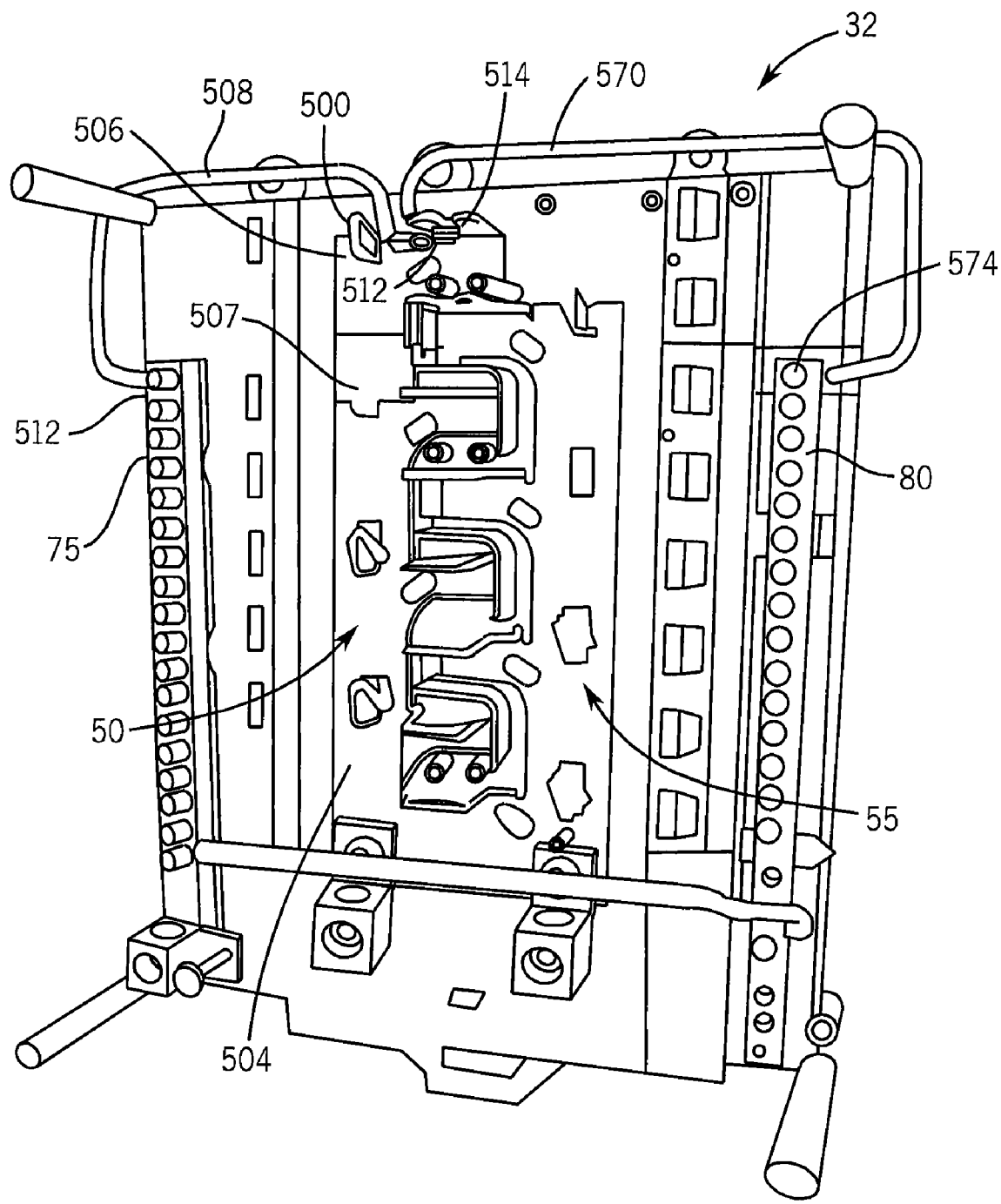
FIG. 9 is a view similar to FIG. 8 showing an alternate embodiment of an electrical panel in accordance with the present invention.

An electrical panel constructed to provide functionality similar to that achieved with a separate neutral bracket and electrical panel, such as illustrated in FIGS. 6-7, is illustrated in FIGS. 8-9. For purposes of clarity, like reference characters will again be used where possible. In the embodiment shown in FIG. 8, the electrical panel 32 is constructed to have an isolated neutral stab 500 that is electrically connected to neutral side bar 75 by wire 502 using fasteners 225, 226. More particularly, service bus conductor 55 is notched so as to form two separate bus conductor segments 504, 506 separated by a notch or gap 507. The service bus conductor 55 is notched in a manner so that bus conductor segment 504 has multiple stabs 60 whereas bus conductor segment 506 has only the isolated neutral stab 500.

FIG. 9 illustrates another embodiment of an electrical panel in accordance with the present invention. In this embodiment, the electrically isolated neutral stab 500 is electrically connected to both neutral side bars 75, 80 using a pair of wires 508, 510 attached directly to the electrically isolated neutral stab 500 using respective wire terminal connections 512, 514. In this embodiment, the neutral stab 500 is formed in service bus conductor 50 rather than service bus conductor 55 by notching service bus conductor 50 so that a notch or gap 507 is formed between bus conductor segment 504 and bus conductor segment 506.

While the invention has been shown and described with respect to a particular embodiment, it is understood that alternatives and modifications are possible and are contemplated as being within the scope of the present invention. For example, the neutral bracket apparatus 20 may be used in connection with a wide variety of electrical panels or load centers, and is not limited to the particular type and configuration of electrical panel as shown and described. In addition, the particular configuration of the mounting members of the neutral bracket apparatus may vary from the configuration as shown and described. The end mounting areas of the neutral bracket apparatus may be secured to the load center neutral bars in any satisfactory manner that establishes an electrical connection, and the central mounting area of the neutral bracket apparatus have any satisfactory configuration that is capable of being engaged by a pair of switches in order to establish a neutral connection with the switches. The switches may be aligned with each other as shown and described, or may have an offset arrangement.

Various alternatives and embodiments are contemplated as being within the scope of the following claims particularly pointing out and distinctly claiming the subject matter regarded as the invention.

I claim:

1. An electrical panel operable to receive electrical power from a first power supply and a second power supply, comprising:
    two bus conductors having a plurality of stabs configured to engage a plurality of switching devices; and
    a separation formed in one of the two bus conductors to electrically isolate one of the plurality of stabs from others of the plurality of stabs.

2. The electrical panel of claim 1 further comprising a neutral side bar and an electrical lead connecting the electrically isolated stab to the neutral side bar.

3. The electrical panel of claim 2 wherein the neutral side bar includes a first lug and the electrically isolated stab includes a second lug, and wherein the electrical lead is secured at one end to the first lug and is secured at an opposite end to the second lug.

4. The electrical panel of claim 2 further comprising a second neutral side bar and a second electrical lead connecting the electrically isolated stab to the second neutral side bar.

5. The electrical panel of claim 2 wherein the electrically isolated stab provides a means for electrically isolating one or more switching devices that may be actuated to selectively complete a connection to the neutral side bar.

6. An electrical panel for interconnecting a load having a neutral conductor to either a first power supply or a second power supply, comprising:
    a first neutral side bar;
    a first service bus conductor bar and a second service bus conductor bar, wherein one of the first service bus conductor bar and the second service bus conductor bar has a first bus conductor segment and a second bus conductor segment;
    a notch electrically isolating the first bus conductor segment and the second bus conductor segment;
    a switch assembly mounted to the first service bus conductor bar and the first bus conductor segment of the second service bus conductor bar, and adapted to switchably electrically connect the load between the first power supply and the second power supply; and
    a neutral switch assembly mounted to the second conductor segment of the second service bus conductor bar, and adapted to switchably electrically connect the neutral conductor of the load to either the first power supply or the second power supply.

7. The electrical panel of claim 6 further comprising an electrical lead connecting the second conductor segment of the second service bus conductor bar to the first neutral side bar.

8. The electrical panel of claim 7 further comprising a second neutral side bar and another electrical lead connecting the second conductor segment of the second service bus conductor bar to the second neutral side bar.

9. The electrical panel of claim 6 wherein the switch assembly includes a first double pole transfer switch and a second double pole transfer switch.

10. The electrical panel of claim 6 wherein the first power supply is an electrical generator and the second power supply is a utility power source.

11. An electrical panel comprising:
    a first input electrically connectable to a first power supply;
    a second input electrically connectable to a second power supply;
    a first service bar connected to the first and second inputs and having a first plurality of stabs;
    a second service bar connected to the first and second inputs and having a second plurality of stabs; and
    wherein the second service bar includes at least one electrically isolated stab.

12. The electrical panel of claim 11 further comprising a first neutral side bar and a second neutral side bar, and wherein the electrically isolated stab is electrically connected to at least one of the first neutral side bar and the second neutral side bar.

13. The electrical panel of claim 12 wherein the electrically isolated stab is electrically connected to both the first neutral side bar and the second neutral side bar.

14. The electrical panel of claim 11 wherein the first power supply is a generator and the second power supply is a utility power source.

* * * * *